United States Patent [19]

Meiller

[11] Patent Number: 4,739,959

[45] Date of Patent: Apr. 26, 1988

[54] ADJUSTABLE SEAT

[75] Inventor: Hermann Meiller, Amberg, Fed. Rep. of Germany

[73] Assignee: Willibald Grammer, Amberg, Fed. Rep. of Germany

[21] Appl. No.: 825,694

[22] Filed: Feb. 3, 1986

Related U.S. Application Data

[63] Continuation of Ser. No. 551,959, Nov. 15, 1983, abandoned.

[30] Foreign Application Priority Data

Nov. 26, 1982 [DE] Fed. Rep. of Germany ....... 3243747

[51] Int. Cl.$^4$ ............................................. F16M 13/00
[52] U.S. Cl. .................................... 248/393; 248/395;
248/423; 297/328
[58] Field of Search ............... 248/393, 394, 395, 396,
248/397, 398, 429, 423; 297/328, 327, 313

[56] References Cited

U.S. PATENT DOCUMENTS

| 3,695,570 | 10/1972 | Ishida | 248/397 |
|---|---|---|---|
| 3,848,937 | 11/1974 | Harder | 248/393 |
| 3,861,638 | 1/1975 | Tong | 248/423 |
| 3,940,181 | 2/1976 | Cheek | 297/313 |
| 3,977,725 | 8/1976 | Tengler et al. | 248/393 |
| 4,067,533 | 1/1978 | Kazaoka et al. | 297/328 |
| 4,339,103 | 7/1982 | Mori et al. | 297/327 |
| 4,513,937 | 4/1985 | Langmesser, Jr. et al. | 248/394 |

FOREIGN PATENT DOCUMENTS 2332763 1/1974 Fed. Rep. of Germany .
2723550 12/1978 Fed. Rep. of Germany .

Primary Examiner—Ramon O. Ramirez
Attorney, Agent, or Firm—Lackenbach Siegel Marzullo & Aronson

[57] ABSTRACT

A seat comprising a seat base portion which is adjustable in respect of inclination has a seat base frame which is mounted pivotally at its rearward portion on a supporting arrangement. Disposed on the supporting arrangement in the front region thereof is a rotary shaft, with a lever arm secured to each end thereof. The lever arms are in turn pivotally connected to the seat base frame. At least one of the lever arms has a plurality of detent openings which are disposed in an arcuate array and which can be selectively engaged by a detent member carried by the seat base frame, to latch the seat base frame in the desired inclined position. The actuating lever for the detent member is disposed at the side of the seat, within easy reach of the occupant thereof.

4 Claims, 2 Drawing Sheets

ADJUSTABLE SEAT

This application s a continuation of application Ser. No. 551,959, filed 11/15/83 now abandoned.

BACKGROUND OF THE INVENTION

The invention relates to a seat and more particularly a seat for use in a motor vehicle, having a seat base or squab portion which is adjustable in respect to inclination in its longitudinal direction.

A very wide range of different constructions is known in regard to seats, such as seats for motor vehicles, in which the seat surface is adjustable in inclination, in the longitudinal or fore-aft direction of the seat. In such arrangements, the seat frame which carries the seat surface, that is to say, the upholstery of the seat, is mounted pivotally at its rearward end region on a mounting means which is supported on a floor or like support surface. The height of the seat surface can be altered in the front region of the seat, by operation of a lever mechanism. Some adjustable seat constructions do not have a mechanism which provides for adjustment of the angle of the seat base portion by lever forces which act directly to adjust the angle of inclination of the seat, but in contrast, the inclination of the seat is adjusted, after releasing a latching means which fixes the front portion of the seat in position, by a shift in weight on the part of the occupant; when the seat has been moved into its desired position in that way, the seat is then latched in position again. Both releasing the latching mechanism and relocking the latching mechanism after adjustment of the seat requires actuation of a handle which, in previously known seats which are adjustable in respect of inclination, is arranged on the floor mounting means of the seat or adjacent to the floor of the body of the motor vehicle in which the seat is disposed. Such an arrangement suffers from the disadvantage that, when the occupant of the seat wants to release the latching means in order to adjust the angle of the seat, then, so as to be able to reach the handle of the latching mechanism, the seat occupant will be required frequently to move out of the position, namely, leaning back against the backrest, which best enables him to shift his weight in order to adjust the inclination of the seat and in which he will also want to establish what is the most comfortable angle of inclination of the seat surface, in order to adjust the seat in that position. Because therefore it is not possible for the occupant of the seat to adjust the seat while sitting therein in the most natural position of leaning against the backrest, adjusting the seat to the desired position will require repeated actuation of the locking mechanism and a number of different attempts to find the desired position of the seat. Everybody who uses such a seat suffers from the above-indicated disadvantage, but people of small physical build with relatively short length of arm will suffer from that disadvantage to a more serious degree than people who are of larger physical build, who will be able to reach the actuating mechanism more easily. As will be appreciated however setting the seat in the proper inclined position is a factor of really significant importance for small people, for example in order to have a satisfactory field of view out of a motor vehicle.

Some of the known seat arrangements of the above-indicated kind also suffer from a further disadvantage, namely that the locking mechanism which is disposed at or in the vicinity of the floor of the vehicle is not sufficiently freely accessible so that the occupant of the seat may suffer from injury for example to the fingers, in seeking to operate the mechanism.

SUMMARY OF THE INVENTION

An object of the present invention is to provide a seat surface which is readily adjustable in respect to inclination in the longitudinal or fore-and-aft direction thereof.

Another object of the present invention is to provide a seat having a seating surface which is adjustable in respect of inclination, such that the mechanism required for such adjustment is within easy reach of the occupant, irrespective of the inclination of the seat.

Yet another object of the present invention is to provide a seat having a seat portion which is adjustable in respect of inclination in the longitudinal direction, wherein the mechanism for adjusting the inclined position of the seat does not require the occupant of the seat to leave the selected physical position in the seat, in order to set the seat in that position.

Still another object of the present invention is to provide a seat having a seat portion which is adjustable in respect of inclination, with an operating mechanism which is disposed at a position conveniently reached by the person occupying the seat, without the danger of that person damaging hands or fingers against other components disposed in the vicinity of the seat.

These and other objects of the invention are attained by means of a seat, such as a seat for a motor vehicle, comprising a seat base or squab arrangement including a seat base frame and a seat surface means thereon. The seat base arrangement is mounted on a support surface such as a motor vehicle floor by a suitable mounting means. The seat has means for connecting the seat base frame to the floor mounting means at the rearward end of the seat base frame, pivotally about an axis extending substantially transversely with respect to the seat base frame or the fore-and-aft direction of the seat. A shaft having first and second ends is disposed at the front portion of the mounting means, extending parallel to the above-mentioned pivotal axis. A respective lever is carried on each end of the said shaft, and is connected by a connecting member such as a trunnion or pin portion to the seat base frame. Pivotal movement of the levers and thus the shaft will cause the angle of the seat base arrangement, in the longitudinal direction thereof, to be adjusted.

At least one of the levers on the shaft has a plurality of detent means such as detent openings therein, being disposed in an arcuate configuration or array which extends from a position at least substantially adjacent to the point of connection between the shaft and the respective lever, towards the floor mounting means, at a spacing from the connecting member or trunnion. An adjusting means which is mounted for example to the seat base frame includes a detent member which is operate to engage selectively with a respective one of said detent openings, thereby to latch the lever in a selected angular position so that the seat surface is held in an adjusted inclined position.

It will be seen therefore that, with the above-defined arrangement, the mechanism which is required for actuating the detent member for latching the seat in the desired position can move with the movement of the seat, so that the distance between the detent member and the seat surface, which is to be considered as the reference location or plane for the operator and occupant of the seat, always remains the same. That therefore provides for easy and satisfactory operation of the seat while the occupant is in the position or attitude which he or she wishes to occupy in the final adjusted position of the seat, so that the above-mentioned repeated actuation and testing of the seat position, in which the operator must repeatedly move out of the position that that person wishes to adopt in the final adjusted position of the seat, in order thus to actuate the latching mechanism, no longer occur.

In accordance with a preferred feature of the invention, the axis of the connecting trunnion or like member which connects the respective lever to the seat base frame, and the axis of the rotatable shaft, which both therefore co-operate with the lever, are disposed on a horizontal line, in the starting or initial position of the seat, in which therefore no adjustment in respect of the angle of inclination of the seat base arrangement has been effected, as disposing the connecting trunnion and the rotatable shaft in that way makes it easier to fit the lever to the seat structure. As, by virtue of the lever having a fixed point of pivotal or rotary movement and by virtue of the fixed rearward axis abut which the seat base frame is pivotal, the connecting member which is connected to the lever is subjected to a linear movement, the or each connecting member must be guided in a respective slot in the associated lever, and the longitudinal axis thereof preferably coincides with the straight line which connects together the axis of the respective connecting member or trunnion and the axis of the rotatable shaft.

The center point of the arc defined by the array of detent openings is preferably disposed at a lower lever than the horizontal line which connects the axes of the connecting member or trunnion and the rotatable shaft (when the seat is in the rest position), being disposed substantially centrally between said axes. That gives the best path along which the arcuate configuration extends, in regard to stepped or graduated movement in regard to the angle of inclination of the seat surface. Preferably, the detent openings in the respective lever are in the form of slots which are successively disposed at a different angle of inclination with respect to the horizontal; with that arrangement, the detent member of the adjusting mechanism is also of a square or rectangular cross-section which is adapted to the configuration of the slots. The end portion of the detent member of the actuating mechanism, with which the detent member engages into the detent openings, is preferably chamfered or bevelled on one or two sides, so as to facilitate engagement into the detent openings.

Each lever means which is provided with the detent openings is desirably of a sector-like configuration, with the detent openings being disposed in the region of the wide end of the sector, which has a curved outline, while the axis of the connecting member connecting the lever means to the seat base frame is preferably disposed in the region of the tip or pointed portion of the sector. The sector configuration promotes pivotability of the lever means which must be of sufficient width to accommodate the arcuate array of detent openings, in comparison with a square or rectangular lever member of the same sufficient dimensions.

The detent member which is for example in the form of a pin or projection is preferably actuated by way of a lever which is secured to the seat base frame at one longitudinal side thereof and which is spring-loaded into latching detent engagement. Arranging the actuating lever at the side of the seat makes it possible for the adjusting mechanism to be disposed at a short distance from the hand of the operator, in comparison for example with an adjusting mechanism which is disposed at the front of the seat and which therefore requires to occupant of the seat to bend over further in order to reach the operating lever. It may be particularly advantageous, in one embodiment of the seat, for the actuating lever to be incorporated into a hollow gripping member which is mounted to the seat base frame parallel to the lever means carrying the detent openings, and masking same in an outward direction, thereby on the one hand ensuring that the fingers of the operator cannot be damaged by the mechanism or other components and on the other hand also ensuring that coarse pieces of fouling material cannot penetrate into the lever and detent mechanism.

Further objects, features and advantages of a seat in accordance with the principles of the present invention will be more clearly apparent from the following description of a preferred embodiment thereof.

DESCRIPTION OF THE PREFERRED EMBODIMENT

Figure 1:
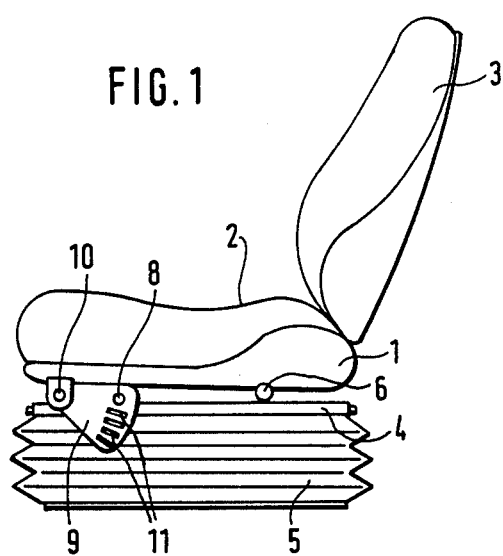
FIG. 1 shows a side view of a seat which is adjustable in respect of the angle of inclination of its seat surface, in its initial position.
Figure 2:
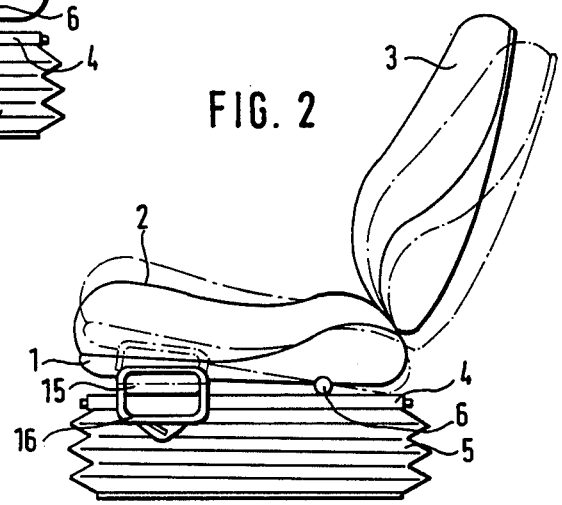
FIG. 2 shows the FIG. 1 seat in its initial position and in an adjusted inclined position.
Figure 3:
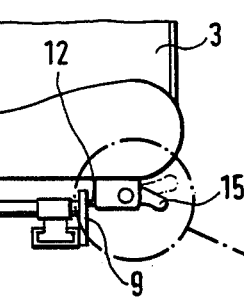
FIG. 3 shows a front view of the base part of the seat shown in FIG. 1, with detent mechanism shown separately and on an enlarged scale.

Referring firstly to FIGS. 1 to 3, shown therein is a seat as for a motor vehicle, comprising a seat base arrangement formed by a seat base frame 1 and upholstery 2 defining the seat surface means carried on the seat frame 1, and a bracket 3 which is suitably connected to the seat base frame 1. The seat base frame 1 is supported on a support or mounting assembly 4 which is for example secured to a floor or like support surface and which, as shown also in FIG. 4, comprises two rail members 4' which are secured to the seat base frame 1, and two rail members 4" which in the embodiment illustrated are secured to an air cushion 5 for seat height adjustment purposes, the co-operation of the pairs of rail members 4' and 4" permitting the seat frame to be displaced in the longitudinal or fore-and-aft direction of the seat.

Figure 4:
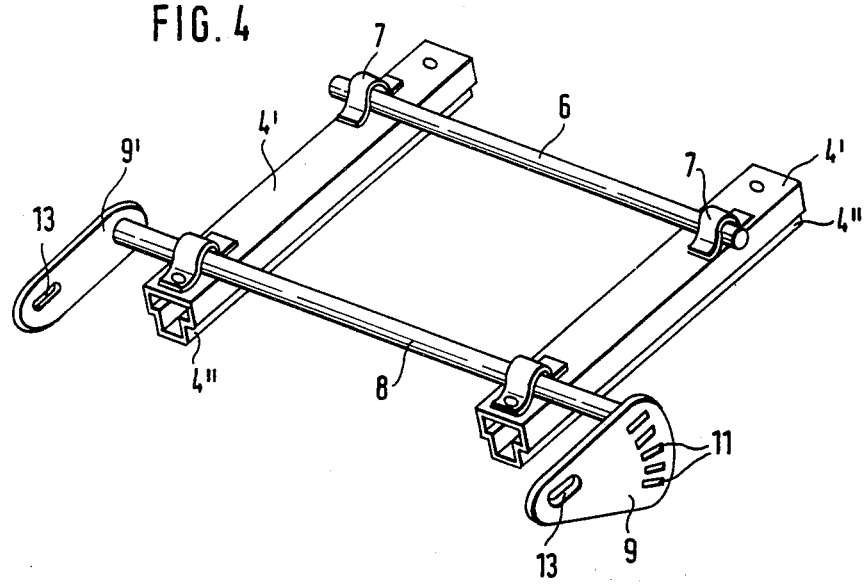
FIG. 4 shows a perspective view of the support or mounting assembly of the seat with a pivotal shaft associated therewith, also showing a part of the arrangement for changing the angle of inclination of the seat base portion.

So that the seat base arrangement 1 and 2 can be adjusted in respect of its angle of inclination in its longitudinal direction, the seat base frame 1 is mounted in its rearward region on a shaft 6 which is rotatably supported on the rail members 4' by suitable bearing members 7, as shown in FIG. 4. The shaft 6 is thus stationarily located on the rail members 4', insofar as it cannot be displaced in the longitudinal direction thereof, but can only rotate in the bearing members 7. The shaft 6 thus represents the axis of pivotal movement for adjusting the angle of inclination of the seat frame 1.

It will be appreciated that, instead of the shaft 6 connecting the two rail members 4' in the manner illustrated, the seat base frame 1 could also be suitably mounted on the support assembly 4 by means of axially aligned pivotal mounting trunnions which are then suitably received in the bearing members 7.

As shown also in FIG. 4, a shaft 8 is mounted by suitable bearing members (not referenced) in the front region of the support assembly 4, being carried on the rail members 4'. The shaft 8 is stationary, in the same way as the shaft 6, in that it can rotate in its bearing members on the rail members 4' but cannot be displaced in the longitudinal direction of the rail members 4'. The shaft 8 thus passes across the top of both of the rail members 4' and is disposed parallel to the axis of the shaft 6, or the two pivotal mounting trunnions in the alternative construction referred to above. Fixed to respective ends of the shaft 8 are lever arms 9 and 9' respectively. At a spacing from its point of connection to the shaft 8, each lever arm 9, 9' has a connecting pivot member in the form of a mounting trunnion or pin portion 10 which is mounted to the seat base frame 1. The connecting members 10 are shown in diagrammatic form in FIG. 1.

At least one of the lever arms, being the lever arm 9 in the embodiment illustrated, has a plurality of detent means in the form illustrated of detent openings 11. The detent openings 11 are disposed in an arcuate configuration which starts substantially from the region of the point of connection between the lever arm 9 and the rotatable shaft 8, and extends downwardly (as viewed for example in FIG. 1) towards the support assembly 4. The detent openings are thus disposed one above the other, as can be most clearly seen from FIG. 5. Secured to the seat base frame 1 is a detent member 12 in the form of a detent pin or projection which forms part of an adjusting mechanism and which can be brought selectively into engagement with respective ones of the detent openings 11, in a manner which will be more clearly apparent hereinafter.

For the purposes of altering the angle of inclination of the seat surface 2, the detent member 12 is pulled out of the detent opening 11 in which it is then disposed, by suitable actuation of the lever 15 which is mounted for example on the seat base frame 1 on one longitudinal side thereof. The lever 15 is for example spring-loaded by a spring not shown, to cause the detent member 12 to be urged into detent latching engagement with the selected one of the detent openings 11.

With the detent member 12 disengaged from the associated detent opening 11, the occupant of the seat shifts his or her weight in the seat, to apply it to the backrest 3 in order to cause the seat surface to be more sharply inclined rearwardly or to the seat base portion of the seat to cause it to assume a less severely inclined position, thereby causing the seat base frame 1 to pivot about the shaft 6. When that happens, the shaft 8 with the lever arms 9, 9' is also pivoted relative to the rail members 4' and 4''. When the seat is in the desired adjusted position, the detent member 12 is then re-engaged into the appropriate one of the detent openings 11, to latch the seat surface 2 in the appropriate position.

As will be seen from FIG. 1, when the seat is in the initial position, that is to say, the position in which it is not adjusted rearwardly in inclination, the axis of the connecting member 10 and the axis of the rotary shaft 8 are disposed on a horizontal line. That condition can also be clearly seen from FIG. 5, which includes a straight line passing through the axis of the shaft 8 and the center of the slot 13 for receiving the connecting member 10.

Figure 5:
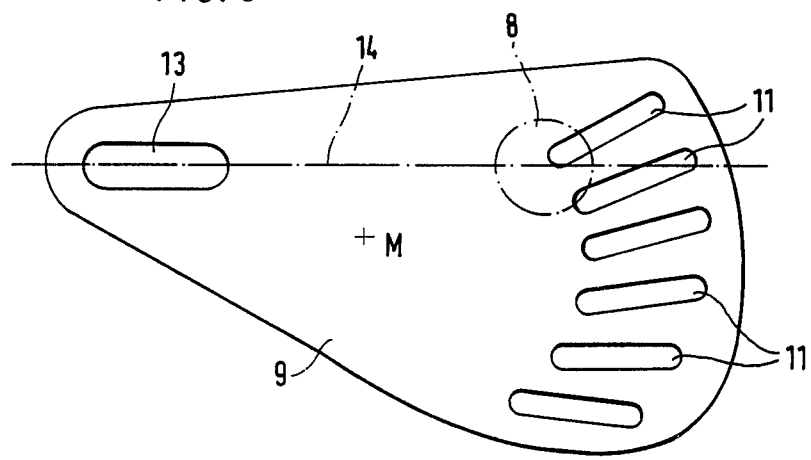
FIG. 5 is a side view of a lever arm which carries detent openings, for determining the inclined position of the seat.

Referring still to FIG. 5, as, upon pivotal movement of the seat base arrangement about the shaft 6 and the shaft 8, the connecting member 10 is necessarily caused to perform a linear movement, the lever arm 9 which is connected to the connecting member 10, or both lever arms 9 and 9' if both lever arms are connected to respective connecting members 10, has or have a slot 13 for accommodating the respective connecting member 10. It will be seen from FIG. 5 that the longitudinal center line of the slot 13 is disposed on the straight line which joins the axis of the connecting member 10 and the axis of the rotatable shaft 8, as indicated by reference number 14.

Referring still to FIG. 5, the center point M of the arcuate configuration on which the array of detent openings 11 is disposed is located below the straight line 14 connecting the axis of the connecting member 10 and the axis of the rotary shaft 8, more specifically, approximately centrally between those two axes.

Preferably, as shown also in FIG. 5, each of the detent openings 11 is in the form of a slot so that the detent member 12 which engages thereinto is of a wide configuration, adapted to carry the loadings involved with an adequate safety margin. The detent openings 11 are each inclined with respect to the horizontal line 14, at different angles of inclination, thereby to adapt them to the required different angles of inclination of the seat surface means 2.

The lever arm 9 which carries the array of detent openings 11 is preferably of a sector-shaped configuration, as can be clearly seen from both FIGS. 1 and 5. The slot 13 is disposed in the region of the pointed portion or tip of the sector, while the detent openings 11 are desirably disposed in the wider portion of the sector, adjacent the curved outline thereof.

In order further to enhance and complete the above-described mechanism and arrangement, FIG. 2 shows that the actuating lever 15 is desirably incorporated into a hollow gripping member or grip shell portion which thus masks the detent mechanism comprising the components 9, 11 and 12, in an outward direction. That assists in ensuring that the fingers of the occupant of the seat cannot become caught or jammed in the adjusting mechanism, due to inadvertence on the part of the operator. The gripping member which thus incorporates the lever 15 preferably extends parallel to the lever arm 9 carrying the detent openings 11.

It will be appreciated that the above-described structures are given by way of example only of the teaching in accordance with the principles of the present invention, and that various modifications and alterations may be made therein, without thereby departing from the spirit and scope of the present invention.

I claim:

1. A reclining seat capable of fine steps of adjustable longitudinal inclination comprising:
   (a) a seat base frame with a seat surface mounted thereon longitudinally,
   (b) said frame comprising two, parallel, transverse pivot means, one rearward and one frontward across said frame, said frontward pivot means in the form of a fixed, rotatable shaft having two ends,
   (c) lever arms secured to each of the ends of the forward pivot shaft and connected to a bearing journal in front of the forward pivot shaft and attached to the forward portion of the seat surface, each of said lever arms having a slot wherein the ends of the bearing journal are displaceably mounted, (d) at least one of said slotted lever arms connecting said forward pivot shaft to said bearing journal, said one arm having an array of slot-shaped detent openings closely one above the other successively at different angles of inclination in an arcuate configuration, so that the axes of said detent openings if extended forward cross each other at a plurality of geometrical uncentered points, (e) said seat base frame bearing at least one detent projection pin adapted to be brought selectively into and out of engagement with a selected one of said detent openings, whereby the seat surface is latched securely into and can be disengaged from a series of closely stepped positions, based on the close non-radial axes of the detent openings.

2. The adjustable reclining seat of claim 1, wherein the slotted lever arm of (d) having an array of slot-shaped detent openings is sector-shaped with a center of gravity below a geometrical axis drawn between the slot through which the bearing journal is mounted and the cavity in which the forward pivot shaft is connected.

3. The adjustable reclining seat of claim 1, wherein the projection pin of (e) is spring-loaded and actuated by a lever fastened to one side of the seat frame.

4. The adjustable reclining seat of claim 3, wherein the lever actuating the projection pin is incorporated into a knob parallel to and outboard of the lever arm having the array of slot-shaped detent openings.

* * * * *